Aug. 1, 1933.  G. M. NELL  1,920,763
VALVE CONTROLLED FLUID PRESSURE TOOL
Filed April 10, 1929
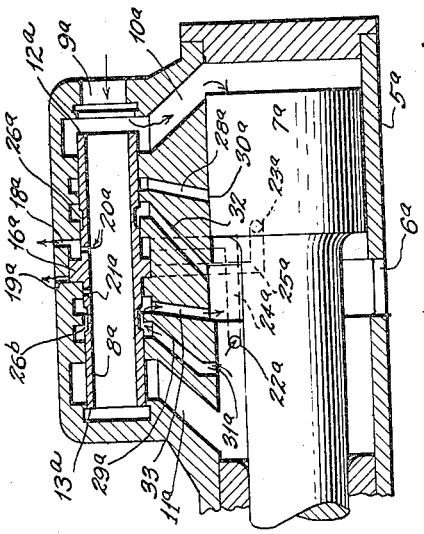
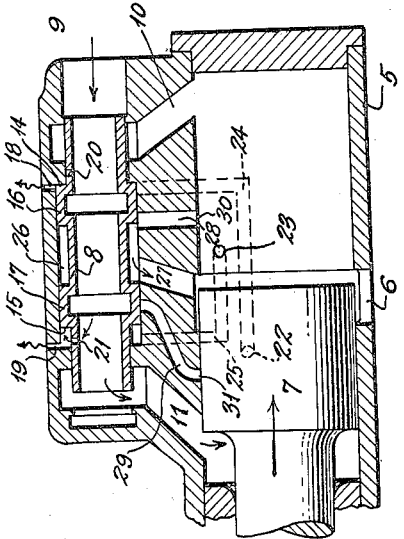
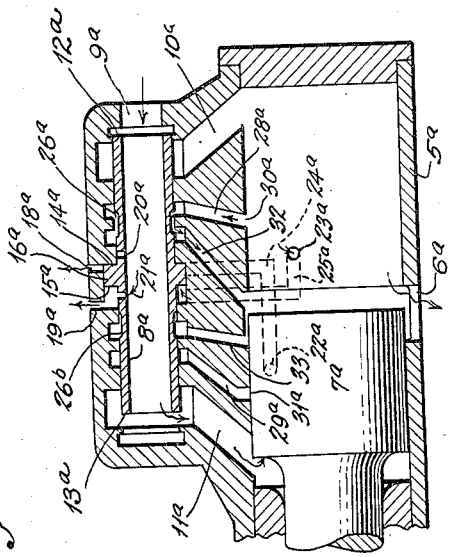
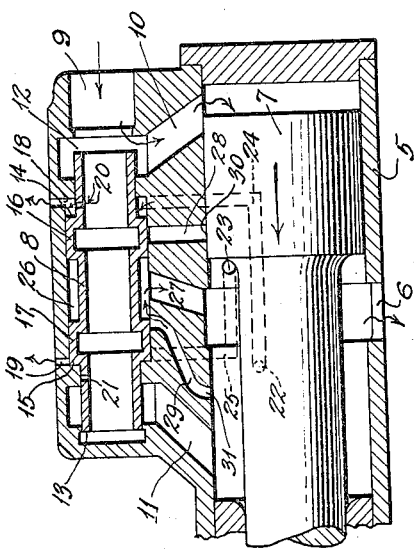
INVENTOR.
Gustave M Nell
BY
Ira L. Nickerson
ATTORNEY.

Patented Aug. 1, 1933

1,920,763

UNITED STATES PATENT OFFICE 1,920,763

VALVE CONTROLLED FLUID PRESSURE TOOL

Gustave M. Nell, Detroit, Mich., assignor to Chicago Pneumatic Tool Company, New York, N. Y., a Corporation of New Jersey Application April 10, 1929. Serial No. 353,928

4 Claims. (Cl. 121—28)

This invention relates to fluid pressure tools and motors in which the main exhaust is piston controlled and in which the distribution and control of the motive fluid are effected by an automatically thrown valve which moves in timed relation with the movements of the piston.

One object of the invention is to provide an improved valve and porting arrangement for a fluid pressure tool. Another object is to make the valve positive in its movements and to minimize or entirely to avoid "fluttering" of the same. Other objects will be apparent from the detailed description which follows.

In order to illustrate the invention concrete embodiments thereof are shown in the accompanying drawing, in which:

Fig. 1 is a sectional view of so much of a fluid pressure tool as is necessary to understand the invention;

Fig. 2 is a sectional view similar to Fig. 1 but showing the parts in different positions; and Figs. 3 and 4 are sectional views similar to Figs. 1 and 2 but showing a modification.

The percussive motor disclosed in Figs. 1 and 2 comprises a cylinder 5 having an exhaust groove and atmospheric port 6 intermediate its ends arranged to be overrun by a piston 7 reciprocable therein. The movement of piston 7 is controlled by a sleeve valve 8 disposed in a valve chest in parallelism with and closely adjacent the piston chamber. Motive fluid admitted through the inlet 9 directly into the bore of valve 8 is distributed under control of the ends of the valve alternately to a passage 10 leading to the rear end of the piston chamber and to a passage 11 which communicates with the front end thereof. The end faces or areas 12 and 13 of the valve are of equal size and accordingly tend to balance one another since they are continuously subjected to the pressure of the motive fluid from inlet 9. Additional opposed areas 14 and 15 are provided on spaced radial flanges 16 and 17 on the valve, these areas being continuously vented through restricted atmospheric ports 18 and 19 respectively. Live air ports 20 and 21 through the valve itself in proximity to areas 14 and 15 respectively, alternately direct motive fluid in limited amount thereto depending upon the position of the valve. Piston controlled means in the form of ports 22 and 23 with their respective associated passages 24 and 25 either vent areas 14 and 15 respectively through main exhaust port 6 in the piston chamber or supply the areas with pressure fluid from the piston chamber to shift the valve. Space 26 between flanges 16 and 17 of the valve is constantly vented through a passage 27 extending to main vent groove and port 6 or directly to atmosphere and is utilized to provide auxiliary exhaust means for the piston chamber under control of both piston 7 and valve 8 by the provision of passages 28 and 29 controlled by valve flanges 16 and 17, and opening into the piston chamber through ports 30 and 31 respectively.

The operation of the motor is as follows: With the parts in the position shown in Fig. 1 motive fluid entering at 9 passes the right end of the valve through passage 10 to the rear of the piston chamber to drive piston 7 forwardly. Valve areas 12 and 13 are in balance. Valve area 15 is vented to atmosphere. Valve area 14 is open to atmosphere both through port 18 and through the piston chamber but valve port 20 is open and although the live motive fluid flowing therefrom is vented, a slight pressure obtains against area 14 sufficient to hold the valve in the position shown. As piston 7 advances, it closes port 23 and then main exhaust 6 but the air in advance of the same continues to escape through the auxiliary exhaust 31, 29, chamber 26, passage 27 and main exhaust 6. Immediately after piston 7 closes the auxiliary exhaust port 31 it uncovers port 23 thereby admitting pressure fluid from the rear end of the piston chamber through passage 25 to valve shift area 15. Although vent 19 is open, it is small in comparison with passage 25 so that sufficient pressure is available immediately on area 15 to overcome the slight pressure on opposing area 14 with the result that the valve is thrown to the rearward position shown in Fig. 2 at which time valve port 20 is closed and 21 is opened, the latter then supplying sufficient live fluid continuously to hold the valve in its new position. In this position passage 10 is cut off from inlet 9 but passage 11 is open with the result that live motive fluid passes through the bore of the valve to the forward end of the piston chamber to drive the piston rearwardly. With its initial rearward movement piston 7 closes the main exhaust 6 but the air in advance thereof continues to escape through the auxiliary exhaust port 30, passage 28, valve chamber 26, passage 27, and main exhaust 6 until port 30 is closed. Shortly thereafter piston 7 uncovers shift port 22 admitting motive fluid from the forward end of the piston chamber through passage 24 to shift area 14 of the valve, whereupon the opposing pressure on area 15 is overcome and the valve is thrown back to its forward position just as exhaust port 6 is opened. With the throwing of the valve, live air port 21 therein is closed and port 20 opened to provide the slight pressure on area 14 necessary to hold the valve in its forward position, and the cycle of operation is completed.

In the alternative form of the invention shown in Figs. 3 and 4, the shift areas 14a and 15a are disposed upon opposite sides of a single central flange 16a. For the auxiliary exhausts, the valve has grooves 26a and 26b outwardly of central flange 16a which grooves establish communication alternately between exhaust passages 28a and 32 on the one hand and between exhaust passages 29a and 33 on the other. Passages 32 and 33 communicate either with main exhaust groove and port 6a as shown or directly with atmosphere. The cycle of operation of the motor shown in Figs. 3 and 4 is identical with that of the form shown in Figs. 1 and 2, corresponding parts, ports, and passages being designated by the same numbers limited by the letter a.

In order to minimize the tendency of the valve or of the piston or of both, to flutter, the spread of the shift ports 22 and 23 or 22a and 23a, in the piston chamber is made less than the length of the piston head controlling the same but the spread of the auxiliary exhaust ports 30 and 31 or 30a and 31a is made greater than the length of the piston head. Further the ports are so arranged that those controlling the shifting of the valve are intermediate the main piston controlled exhaust and the auxiliary exhaust ports in both directions of movement of the piston. The positioning of the shift and the auxiliary exhaust ports and their relative spreads are among the important features of the present invention in that they determine the operating characteristics of the tool—full stroke, powerful blow, and fast action.

While the invention has been herein disclosed in what are now considered to be preferred forms, it is to be understood that the invention is not limited to the specific details thereof, but covers all changes, modifications and adaptations within the scope of the appended claims.

I claim as my invention:

1. A fluid pressure tool having a cylinder providing a piston chamber having a main exhaust port, a piston reciprocable in said cylinder and arranged to orverrun said port, a tubular valve having motive fluid admitted to the bore thereof and controlling with its ends the distribution of the same to the opposite ends of said piston chamber, said valve having opposed shift areas, means controlled by the movement of said valve for supplying motive fluid in limited amount to said shift areas, means under control of said piston for supplying motive fluid to said areas from said piston chamber, and continuously open vents of restricted size in connection with said shift areas.

2. A fluid pressure tool having a cylinder providing a piston chamber having a main exhaust port, a piston reciprocable in said cylinder and arranged to overrun said port, a tubular valve having motive fluid admitted to the bore thereof and controlling with its ends the distribution of the same to the opposite ends of said piston chamber, said valve having opposed shift areas, continuously open vents of restricted size in connection with said shift areas, means controlled by the movement of said valve for supplying motive fluid in limited amount to said shift areas, means including ports under control of said piston on opposite sides of the said main exhaust for supplying motive fluid to said areas from said piston chamber, the spread of said ports being less than the length of said controlling piston, and auxiliary exhaust means for said piston chamber under control of both said valve and said piston including ports on opposite sides of said exhaust port and located beyond said first-named ports.

3. A fluid pressure tool having a cylinder providing a piston chamber having an exhaust port, a piston reciprocable in said chamber and arranged to overrun said port, a valve for controlling the supply and distribution of pressure fluid to said piston chamber, spaced flanges on said valve providing a chamber therebetween and opposed shift areas, means controlled by the movement of said valve for supplying motive fluid to said areas in limited amount, means under control of said piston for supplying pressure fluid to said areas from said piston chamber, means venting the chamber between said valve flanges to atmosphere, and means utilizing said vented chamber and controlled both by said valve and said piston for providing an auxiliary exhaust for one end of said piston chamber.

4. A fluid pressure tool having a cylinder providing a piston chamber having an exhaust port, a piston reciprocable in said chamber and arranged to overrun said port, a valve for controlling the supply and distribution of pressure fluid to said piston chamber, spaced flanges on said valve providing a chamber therebetween and opposed shift areas, means controlled by the movement of said valve for supplying motive fluid to said areas in limited amount, means under control of said piston for supplying pressure fluid to said areas from said piston chamber, means venting the chamber between said valve flanges to atmosphere, and means utilizing said vented chamber and controlled both by said valve and said piston for providing auxiliary exhausts for both ends of said piston chamber including ports on opposite sides of said main exhaust under control of said piston, the spread of said ports exceeding the length of said piston.

GUSTAVE M. NELL.